United States Patent [19]

Chen

[11] Patent Number: 4,509,172

[45] Date of Patent: Apr. 2, 1985

[54] DOUBLE ERROR CORRECTION - TRIPLE ERROR DETECTION CODE

[75] Inventor: Chin-Long Chen, Wappingers Falls, N.Y.

[73] Assignee: International Business Machines Corporation, Armonk, N.Y.

[21] Appl. No.: 424,940

[22] Filed: Sep. 28, 1982

[51] Int. Cl.³ .............................................. G06F 11/10
[52] U.S. Cl. ......................................... 371/38; 371/39
[58] Field of Search ..................... 371/38, 37, 39, 40

[56] References Cited

U.S. PATENT DOCUMENTS

| | | | |
|---|---|---|---|
| 4,077,028 | 2/1978 | Lui et al. | 371/38 |
| 4,107,652 | 8/1978 | Tanahashi et al. | 371/37 |
| 4,236,247 | 11/1980 | Sundberg | 371/38 |
| 4,319,357 | 3/1982 | Bossen | 371/38 |
| 4,336,612 | 6/1982 | Inoue et al. | 371/39 |
| 4,397,022 | 8/1983 | Weng et al. | 371/37 |
| 4,416,010 | 11/1983 | Hibino et al. | 371/37 |

OTHER PUBLICATIONS

H. Imai et al., A Method of Constructing Double-Error-Correcting Codes for Application to Main Memories, Systems-Computers-Controls, vol. 8, No. 5, Oct. 1977, pp. 62–70.

Chen, On Shortened Finite Geometry Codes, Information and Control, vol. 20, No. 3, Apr. 1972, pp. 216–221.

Primary Examiner—Charles E. Atkinson
Attorney, Agent, or Firm—James E. Murray

[57] ABSTRACT

A code is generated using BCH coding theory which corrects double bit failures and detects triple failures and packaging errors. The code is a shortened code in which both data and check bit columns have been removed from the parity check matrix. A decoding technique is used which splits the look-up tables used to reduce their size.

11 Claims, 3 Drawing Figures

DOUBLE ERROR CORRECTION - TRIPLE ERROR DETECTION CODE

BACKGROUND OF THE INVENTION

The present invention relates to error correcting codes for the correction of double errors and the detection of triple and packaging errors in memory arrays.

A double error correcting and triple error detecting (DEC-TED) code can be constructed based on the well known BCH coding theory (see W. W. Peterson and E. J. Weldon, Jr., *Error Correcting Codes*, 1972, MIT Press). To do this, let $\alpha^c$ be a primitive element of the finite field $GF(2^m)$, and $n=2^m-1$. If an element of $GF(2^m)$ is then expressed as a binary m-tuple, a DEC-TED BCH code of length n can be defined as the code with the following parity check matrix:

$$H = \begin{vmatrix} 1 & 1 & 1 & 1 & 1 \\ 1 & \alpha & \alpha^2 & \ldots \alpha^i \ldots & \alpha^{n-1} \\ 1 & \alpha^3 & \alpha^6 & \alpha^{3i} & \alpha^{3(n-1)} \end{vmatrix} \quad (1)$$

The number of check bits $\nu$ and the number of data bits k for this code are $2m+1$ and $n-2m-1$ respectively. If 128 data bits are to be protected by the code, it should be apparent that m must be 8 or larger. For m=8 there is a (255,238) DEC-TED BCH code with n=255, k=238, and $\nu=17$.

BCH codes can be shortened to a desired length by deleting data bit columns from the parity check matrix of the code. Doing this, a (145,128) shortened code can be obtained from the (255,238) DEC-TED BCH code defined by the matrix H in (1).

The number of check bits may also be reduced in the code shortening process by properly choosing the data bit columns in the parity check matrix to be deleted. An article by the inventor on how to do this, entitled "On Shortened Finite Geometry Codes" appeared in the April 1972 issue of Information and Control beginning on page 216. To use techniques described in the article on the parity check matrix H of (1):

(1) Apply elementary row operations (see page 32, W. W. Peterson and E. J. Weldon, Jr., *Error Correcting Codes*, 1972, MIT Press) on the parity check matrix H. Let $H_1$ be the matrix after the row operations, and V be a row vector of $H_1$.

(2) Delete from $H_1$ the row vector V and the column vectors at positions corresponding to the 1's in V. The resulting matrix is the parity check matrix of a shortened DEC-TED code with 2m check bits.

If m is even, a row vector that contains $2^{m-1}-2^{m/2}-1$ 1's can always be found by applying elementary row operations on the matrix H. Applying the shortening scheme above, a DEC-TED code with $k=2^{m-1}+2^{m/2}$, $\nu=2m$ can be constructed. If m is odd, a row vector that contains $2^{m-1}-2^{(m-1)/2}-1$ 1's can be found by applying elementary row operations on the matrix H. Thus, a DEC-TED code with $k 2^{m-1}+2^{(m-1)/2}$, $\nu=2m$ can be constructed.

THE INVENTION

In accordance with the present invention the following matrix was generated for a 144,128 code.

-continued
```
..11111.. .1.1..1.. ..1111.11 .11.111..
......1.. ..11..... .1.....11 .1.111.1.
......11.. .1111111. .1..1...1 ..1.1..1.
........1. .1.111111 ..1....1. ...1.11..
11.11.... ...11.1.. ...1...11 .1..1111.
..1.1.1.. 11.1.11.. .1....111 .11.11...
...11.1.. .11....11 1.11.11.1 ..1.1..1.
.1......1. .1.111... .....1..1 11..111.1
```

In the parity matrix H of (2), each column represents one bit position of the code word. The vertical lines between columns represent a package boundary. That is, each 9 bits in the 144 bit code word are on a different package. (This formulation of H is convenient for applications where the widths of the data path are multiples of 9 bits.) The binary ones in each of the 16 rows in the matrix H show which bits are exclusive ORed together by an encoder to generate one of the 16 check bits stored with the 128 data bits. Bit positions 1, 10, 19, 28, 37, 46, 50, 64, 73, 82, 91, 100, 109, 118, 127 and 136 are check bits. The horizontal line indicates that code and is divisible into 2 data words.

Repackaging to four bit positions per card using row and column swapping results in the following H matrix.

$$H = [\text{144-column, 16-row binary matrix, shown in three horizontal bands labeled with column group indices 1–15, 16–31, and 32–36}] \quad (3)$$

A package error is now detectable i.e. the error is not miscorrected as a single error or a double error. When a UE is detected, the UE syndrome is compared with four triple error syndrome patterns and one quadruple error syndrome patterns for each of the 36 packages to identify the failing package. Table look-up is used in identifying the location of all one and two bit errors in the codeword. The look-up tables are split to considerably reduce the amount of storage space needed to perform the look-up task.

Therefore, it is an object of the present invention to provide a new code to correct single and double bit errors and detect triple bit errors (DEC-TED code).

It is another object of the present invention to provide a DEC-TED code which detects package errors.

It is a further object of the invention to provide a new table look-up scheme for use on correcting and protecting multiple bit errors.

THE DRAWINGS

These and other objects of the invention can best be understood by reference to the embodiment of the invention illustrated in the accompanying drawings of which:

THE PREFERRED EMBODIMENT

Figure 1:
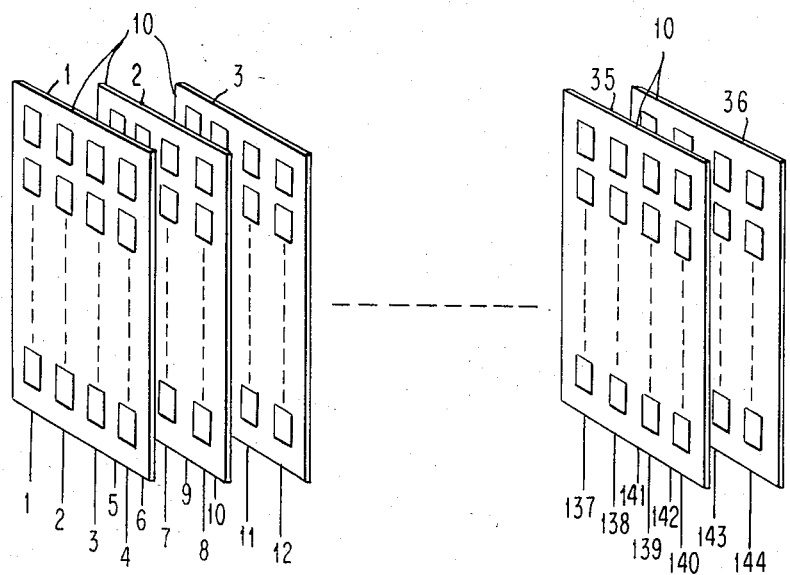
FIG. 1 is a schematic representation of a memory employing the present invention.

In FIG. 1, a 144-bit codeword is stored in a memory on 36 memory cards 10 with four bit positions on each card. For reasons that should now be apparent, 16 bits of the 144-bit codeword are check bits and 128 are data bits.

Figure 2:
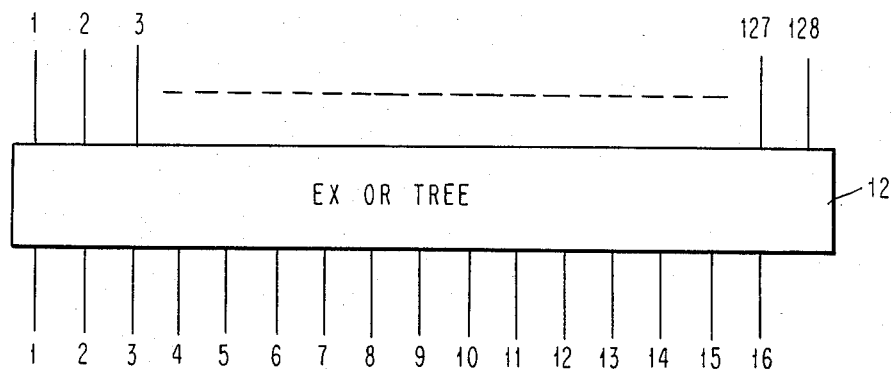
FIG. 2 is a schematic representation of an ECC encoder for the memory shown in FIG. 1.

As shown in FIG. 2, a conventional exclusive OR encoding tree 12 is used to generate the parity bits stored in the memory of FIG. 1. The encoding tree is configured in accordance with the parity matrix H of (3). For instance, the check bit in the first bit location of card 33 is the exclusive-OR of the data in all the bit positions marked with a 1 in the first row of the H matrix. If 2-way exclusive-OR gates are used, each check bit is generated using no more than 70 exclusive-OR gates and 7 levels of logic delay.

Figure 3:
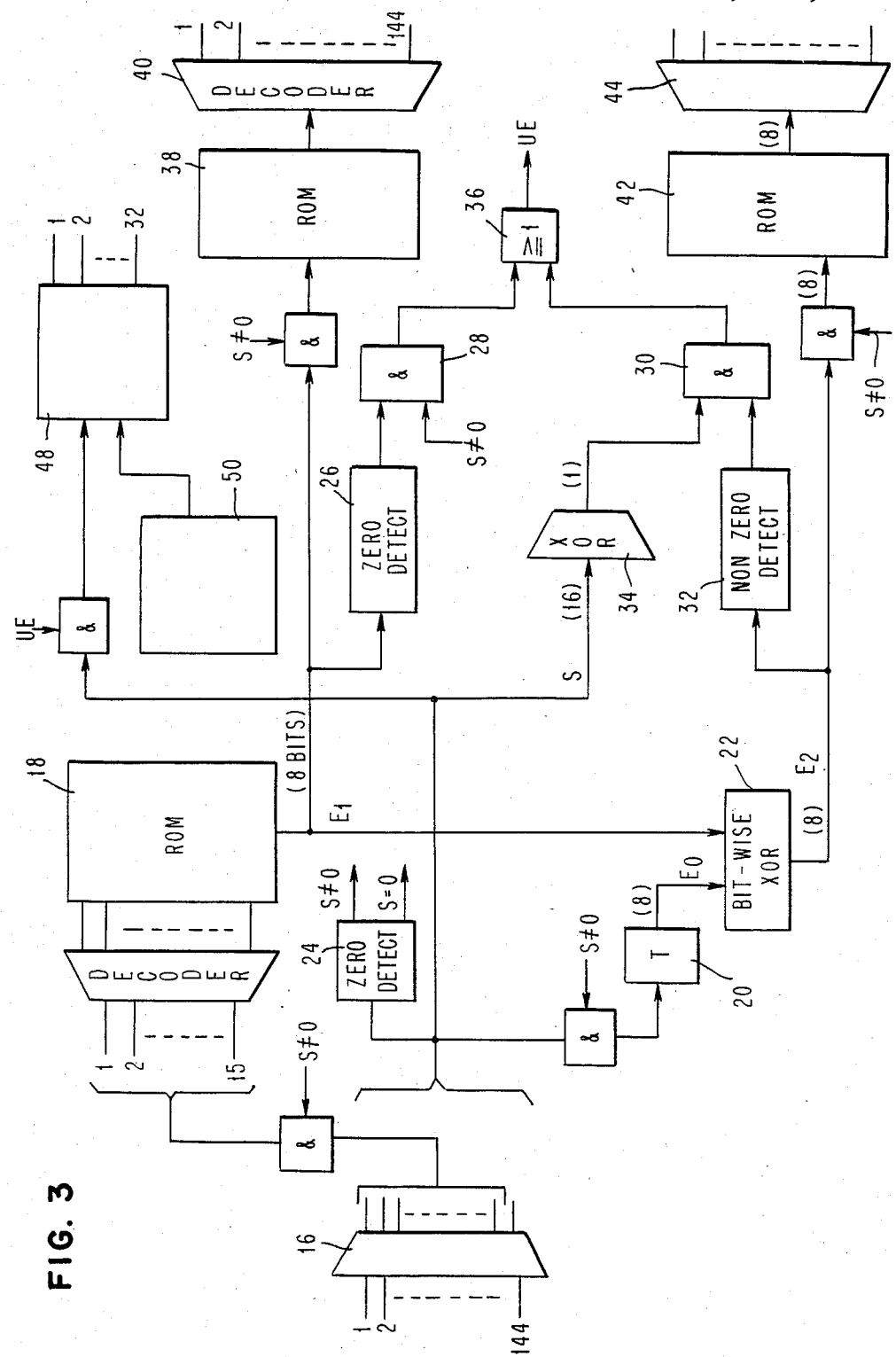
FIG. 3 is a schematic for an ECC decoder for the memory shown in FIG. 1.

In FIG. 3 the 16 bit output of the syndrome generator 16 is logically the exclusive-OR of the 144 data and check bits read out of the memory 10 shown in FIG. 1. The syndrome can also be considered a 16-bit vector obtained as a result of the product of H and the transpose of the received code word. In addition, the syndrome is the XOR of the received check bits and the check bits generated from the received data bits.

If the syndrome S is an all 0's vector, the code word is error free. If the syndrome is a non-zero vector, the first 15 bits of S are used as an address to access the contents of a read-only-memory (ROM) 18. The output of ROM 18 is the 8-bit vector E1 accessed by the 15 syndrome bits at the addresses. The vector E1 is either an all 0's vector or a column vector of the 8×144 matrix M shown below.

$$M = \quad (4)$$

```
...1.1.1.111.1....1.111.1......11.111.1111.1....1111.1.111.....11........
1......11..11......1.1....1.1...1111.111.111.1......1.11...11.11..1.1..1...1111
.1.1.1.11.1.11..........1111...1.1....1..1.1....1.11.11111.1111......1.1....
11..1..1....1.1.1..11...11.111.....1...111...11..1..1111.....11111...1.1.1..
..11.1.11.1....1.1.1..11.1111.11...111...11.111..11.111...111.....1.1.11
1.1.1111....1..1.111.11...1.1111.......1.11....11.11...111.1.11.1.11..1.1.1.1
1-...1.1111......1..11.1.11..1111111...11.1....1.1.1....11....1.1.1.1.1..1.1.1.1
1..1....111.1...11.11.1.....1111.111.11.1......11.1..1.1.1.....111..1..1.11.

1111.1.1111111...11..11.1.1.....1...111..1....1.111..11.1.1.1.....1.111...1111.
..111111..111.1..111...1..11...1.111111..1....1111..1111...1........111...11.
1.1.11111.....1111....11111......1..11..1..1....1.1.1..11....1.11.11.11..
..1..11....11......1.1..1..11.1..1.1.11...11.111.1..1111....111.....1.1.1
111..111.1..11..11...11....11.111..11..1.1111...1..111....1..1..1.1.1.1
..11.11.1111.11..11...1..1....1'1.111...1..1.111..11..1..1....1...11.1..
11.11.11111.1.11....1...1...1.11.11.1......111...1...1....1..11.....11...
111.1..111111..11.11...1.....1.1111.1...1..11..111..111..1.111..11.1..
```

The non-zero entries in the ROM 18 are obtained by the following algorithm:

(1) Store the bit pattern of column i of M at the address specified by column i of H1, where H1 is a matrix formed by the first 15 row vectors of H (3).

(2) Store the bit pattern of column i of M at the address specified by the XOR of columns i and j of H1, where $i < j$.

If E1 is equal to one of these non-zero entries and $S \neq 0$, E1 is fed to a ROM 28 which converts E1 from a Galios field element to a number in the binary sequence. This binary number is fed to a binary decoder 40 that decodes the number into an address of one of the failing bits.

In addition, if the syndrome S is non-zero, the following transformation is made:

$$E0 = T \cdot S^t,$$

where $S^t$ is the transpose of S, and T is the matrix shown below $$T = \begin{matrix} 1 \ldots 1 . 1 1 1 . . 1 1 1 1 . \\ \ldots \ldots 1 1 1 \ldots 1 1 . \\ \ldots 1 . 1 1 . 1 1 . 1 1 . . \\ \ldots 1 1 1 \ldots 1 . 1 . 1 \\ . 1 \ldots 1 \ldots 1 . 1 . 1 . . 1 \\ \ldots \ldots 1 \ldots 1 1 . 1 \ldots \\ . . 1 \ldots 1 1 \ldots . 1 1 \ldots \\ \ldots 1 . 1 1 1 . . 1 1 . 1 \ldots \end{matrix} \quad (6)$$

The matrix T is embodied in a logic array 20 which has an XOR element located at each location in the array 20 corresponding to a location in the matrix marked with a 1. The array is configured so that each 16 bit syndrome accesses one of its columns with the result that the 8 bit syndrome E0 is read out of the array 20.

Mathematically, M, T, and H are related by the equation $$M = T \cdot H.$$

Let $h_1$ and $h_2$ be the columns of H (equation 3) where two errors occurred. The syndrome is $S = h_1 + h_2$. Define the modified syndrome as $$S' = T \cdot S^t,$$

where $S^t L$ is the transpose of S. the S equals a column of M. Since the columns of M are all distinct, the columns can be used to designate the error locations. Thus, let $E_1 = T \cdot h_1{}^t$ and $E_2 = t \cdot h_2{}^t$.

We have $S'=T\ S^t=E_1+E_2$. The first error $E_1$ is obtained from the ROM 18. The second error $E_2$ can be obtained by the XOR of $E_1$ and $S'$. The modified syndrome $S'$ is E0 obtained from the array 20.

The outputs of ROM 18 and array 20 are fed into XOR gates 22 which XOR E0 and E1 together bit position by bit position to generate E2. If E2 is non-zero and the weight of S is even, E2 identifies a second correctable error in a codeword. Like E1 it is then decoded into an error bit position using a Galois to binary lookup converter 42 and a binary decoder 44.

If S is non-zero and E1 is an all 0's vectors, or E2 is non-zero and the weight of S is odd, the errors are uncorrectable errors (UE's). The first UE condition detected by ANDing the outputs of two zero detect circuits 24 and 26 in AND circuit 28. The zero detect circuit 24 monitors the output of the syndrome decoder 16 and the other zero detect circuit 26 monitors the output of the ROM 18. The second UE condition is determined by AND circuit 30 which ANDs the output of a non-zero detect circuit 32 that detects a non-zero E2 output and the output of an exclusive OR circuit 34 which determines if the sum of the bits in the syndrome is odd. Outputs of both AND circuits 28 and 30 are fed to OR circuit 36 which provides the UE output signal.

To locate a failing four bit package 10, the UE output signal gates the syndrome S into a comparator 48 which compares the syndrome S with four syndrome patterns for three bit failures on each card 10 and one syndrome pattern for a four bit failure on each card 10. The output of this comparator 1 is the address of the card 10 that has failed. The syndromes for card failures 50 can be hardwired to the comparator 48 or can be software that is fed to the comparator. The table below lists 1 each of the 16 bit syndromes indicating a card failure alongside a 2 bit number designating the card or package that failed.

| Syndrome | Card ID |
|---|---|
| 0010011001001101 | 1 |
| 1010100000000011 | 1 |
| 0001101000011101 | 1 |
| 0000110010011110 | 1 |
| 1001100011001101 | 1 |
| 0100111110000111 | 2 |
| 1101011100101100 | 2 |
| 0001011000111100 | 2 |
| 0000110110010101 | 2 |
| 1000001100000010 | 2 |
| 0101110010111010 | 3 |
| 0000011110101001 | 3 |
| 1101011011100010 | 3 |
| 0000111001000111 | 3 |
| 1000011101101110 | 3 |
| 1111111110000000 | 4 |
| 0001010110110111000 | 4 |
| 0001101001100011 | 4 |
| 0110100111010101 | 4 |
| 1001100110001110 | 4 |
| 0100101010010011 | 5 |
| 0000111110100010 | 5 |
| 1001101101100110 | 5 |
| 0101110011100101 | 5 |
| 1000001010110010 | 5 |
| 0111111010010111 | 6 |
| 0101101001000000 | 6 |
| 1001101111110000 | 6 |
| 1101001101011001 | 6 |
| 0110110001111110 | 6 |
| 0101011101101100 | 7 |
| 1000100011111000 | 7 |
| 1100001011110101 | 7 |
| 1010111001000001 | 7 |
| 1011001100100000 | 7 |
| 1111011001011110 | 8 |
| 0101000000110001 | 8 |
| 1000101000111001 | 8 |
| 1000010011000001 | 8 |
| 1010100001010111 | 8 |
| 0100100010110101 | 9 |
| 1010101101101100 | 9 |
| 1111001010011100 | 9 |
| 0111100111101101 | 9 |
| 0110100010101000 | 9 |
| 0110011011001000 | 10 |
| 1011100001101110 | 10 |
| 0101010001111101 | 10 |
| 1111111001001101 | 10 |
| 0111010010010110 | 10 |
| 1111011110000010 | 11 |
| 1001111010010101 | 11 |
| 1011000011111010 | 11 |
| 1010111011101000 | 11 |
| 0111011100000101 | 11 |
| 1001110000110010 | 12 |
| 1110011101100100 | 12 |
| 0111100010010111 | 12 |
| 0100110000011000 | 12 |
| 0100111111011001 | 12 |
| 0111110100001011 | 13 |
| 0100010001000110 | 13 |
| 1011011000000101 | 13 |
| 1111010001011010 | 13 |
| 0111101100010010 | 13 |
| 0011111100010101 | 14 |
| 1011100001011110 | 14 |
| 0111010110101010 | 14 |
| 0111011101000110 | 14 |
| 1000010110100111 | 14 |
| 0011001111001000 | 15 |
| 1100110100001111 | 15 |
| 1011110011110110 | 15 |
| 0001111100011101 | 15 |
| 0101110100101100 | 15 |
| 1001000111110010 | 16 |
| 0110100001010011 | 16 |
| 0011000100001010 | 16 |
| 0000101111011110 | 16 |
| 1100001001110101 | 16 |
| 1110011011000101 | 17 |
| 0011001100110100 | 17 |
| 1001111110011101 | 17 |
| 1010101011010101 | 17 |
| 1110000010111001 | 17 |
| 1001010100011001 | 18 |
| 0000100110100100 | 18 |
| 1000001100101000 | 18 |
| 1111101001101110 | 18 |
| 1110010111111011 | 18 |
| 0111110110011000 | 19 |
| 1110100010101101 | 19 |
| 1100000100110110 | 19 |
| 1001110111110000 | 19 |
| 1100100111110011 | 19 |
| 0010110110100010 | 20 |
| 1000000110001100 | 20 |
| 1001111000000101 | 20 |
| 1011011011101101 | 20 |
| 1000100011000110 | 20 |
| 0011010101011110 | 21 |
| 1100011111011101 | 21 |
| 1000101110001100 | 21 |
| 1010010100101001 | 21 |
| 1101110000100110 | 21 |
| 0000111110001111 | 22 |
| 0111110001110010 | 22 |
| 0100000001000001 | 22 |
| 1010100011001111 | 22 |
| 1001101111000111 | 22 |
| 1000001001110110 | 23 |
| 1110001101111110 | 23 |
| 0111001001000011 | 23 |

-continued

| Syndrome | Card ID |
|---|---|
| 0011011000110111 | 23 |
| 0010010101111100 | 23 |
| 1101101101010100 | 24 |
| 0101111000101101 | 24 |
| 0010110101101000 | 24 |
| 0110010100101111 | 24 |
| 1100110100111110 | 24 |
| 1110101110000000 | 25 |
| 1001111001110111 | 25 |
| 0000110001100001 | 25 |
| 0110111001100101 | 25 |
| 0001011111110011 | 25 |
| 0101111101000000 | 26 |
| 0000101100000110 | 26 |
| 1000001011101001 | 26 |
| 1110100001001111 | 26 |
| 0011111011011000 | 26 |
| 1001100010100110 | 27 |
| 0110000011000100 | 27 |
| 0100101101011011 | 27 |
| 0001011010011111 | 27 |
| 1010010110100110 | 27 |
| 0011101110011100 | 28 |
| 0011010100001101 | 28 |
| 1101001010011011 | 28 |
| 1001110110111011 | 28 |
| 0100000110110001 | 28 |
| 1111100010111000 | 29 |
| 0111101001010110 | 29 |
| 1011101001001110 | 29 |
| 0100111001111100 | 29 |
| 0111011011011100 | 29 |
| 0011110000101001 | 30 |
| 1110101110101000 | 30 |
| 1001001001110010 | 30 |
| 1001111101011101 | 30 |
| 1101101010101110 | 30 |
| 1111001000110011 | 31 |
| 1110110101000000 | 31 |
| 0010101110101110 | 31 |
| 0110111100111011 | 31 |
| 0101101111100110 | 31 |
| 1011001011101010 | 32 |
| 1110110010000100 | 32 |
| 1110010101101111 | 32 |
| 0010100000011100 | 32 |
| 1001001100011101 | 32 |
| 0111000000000000 | 33 |
| 1011000000000000 | 33 |
| 1101000000000000 | 33 |
| 1110000000000000 | 33 |
| 1111000000000000 | 33 |
| 0000011100000000 | 34 |
| 0000101100000000 | 34 |
| 0000110100000000 | 34 |
| 0000111000000000 | 34 |
| 0000111100000000 | 34 |
| 0000000001110000 | 35 |
| 0000000010110000 | 35 |
| 0000000011010000 | 35 |
| 0000000011100000 | 35 |
| 0000000011110000 | 35 |
| 0000000000000111 | 36 |
| 0000000000001011 | 36 |
| 0000000000001101 | 36 |
| 0000000000001110 | 36 |
| 0000000000001111 | 36 |

One embodiment of the invention has been described a number of changes can be made in this embodiment. For instance, the number of codeword bit positions on a card 10 could be changed. Therefore it should be understood that many modifications and changes can be made in the illustrated embodiment without departing from the spirit and scope of the invention as represented in the attached claims.

Having thus described my invention, what I claim as new, and desire to secure by Letters Patent is:

1. In an error correction system having a double bit error correction and triple bit error detection code for a memory in which bits of memory code words are divided into N memory packages of M bits per package, modularized error correction apparatus for correcting package errors including:
encoder means for encoding data words into said code words for storage in said memory using a double error correction and triple error detection code characterized by an H matrix substantially as shown below $H =$

```
    1          2          3
 1.11       1.11       11.1       .111       11.1       ..11
 ....       11..       1.1.       1..1.      1...1      ..1.
 11..       ....       ....       1..1       ....       .111
 11.1       .11.       1.1.       ....       ..11       1111
 1...       1..1       1..1       .1..       1111       ....1
 1..1       1111       1111       11..       .1.1       .111
 1.1.       ....1      1...       1.1.       ....1      1111
 ....       ...1.      1.11       ..1.       .11.       ..11
 111.       1..1       ....1      .1..       ..1.       1.1.
 .111       ....       ..11       ..11       ..11       1...
 ....       .11.       ....1      .11.       1....      11.1
 ..11       ..11       .111       .1.1       .111       .1..
 .1..       .11.       11..       1.11       ....       111.
 .1..       1111       111.       111.       ..11       .111
 .1.1       .111       .1..       11.1       ....1      .111
 ....1      1..1       .1.1       ..11       1...1      1..1

1...       .1..       .11.       .1.1       1111       11..
 1.1.       11..       .1..       .1..       .111       1...
 111.       .111       1...       ..1.       .1..       ..11
 .111       11..       ..11       1...       ....1      1.1.
 .1.1       11..       ...1.      .1.1       .1.1       .1..
 1..1       1...       ....       .1..       ..1.       ..1.
 .1..       1.1.       .11.       1..1       ....1      1.11
 .111       ....       .1.1       ....       .111       1.11
 .11.       111.       .1..       .111       1111       11.1
 1111       1..1       .1.1       1111       ..11       1.11
 ....1      .11.       ....1      .11.       ....1      11..
 .11.       ....1      1.1.       11.1       .11.       .1..
 11..       .1.1       1...       1111       ....1      111.
 1.1.       .111       1111       1...       1.11       .11.
 ....       .111       ....       1.11       1.1.       1.1.
 ..11       1...       1..1       ..11       1.11       11.1

..11       1.11       .11.       .111       .1..       .1..
 ..1.       ....1      1.11       1.11       .111       111.
 .1..       1111       1.1.       .11.       ..1.       111.
 .1..       1111       .1..       1.1.       ..11       1..1
 .111       11..       1...       .1.1       ..11       .1.1
 1111       .1..       1...       ....       1.1.       .111
 11.1       1..1       1..1       111.       1111       ..11
 .111       .1..       ..1.       ..11       .11.       ....1
 ....       11.1       1.1.       1...       .1..       1.11
 .1.1       .1.1       1.1.       ....1      1...1      111.
 ....       11.1       11.1       .111       1.11       1....
 111.       11..       ..11       ..1.       1....      .111
 1..1       .11.       ..1.       ..11       11.1       .1..
 .11.       ....1      1...       111.       1111       .1.1
 ..1.       1...       .11.       1111       ....       111.
 1.1.       .111       .1.1       1.11       .1..       .111

1...       1...       1...       111.       11..       .111
 ...1       ....       1.11       .11.       .11.       ..1.
 11..       1..1       1..1       .1.1       1....      ..11
 1..1       ..11       .111       1.11       ..11       11..
 ..1.       1.1.       11.1       ..1.       ....       ....1
 1..1       .1..       ..1.       11..       111.       1...
 ....       ..11       .11.       .111       1111       11..
 .1..       11..       1111       .111       1.11       .1..
 ..1.       ....1      .11.       111.       ....       .1.1
 111.       111.       11..       1...       ....1      .1.1
 1...       1..1       111.       1.11       ....1      1...
 .1..       ....       11..       11..       ..1.       .111
 11..       .1.1       1111       1..1       1.11       1...
```

```
.11.    1...    ...1    1..1    ..1.    ..1.
11.1    .111    .111    ..1.    1111    111.
1.11    ..11    .1.1    .1..    ..11    .1.1

11..    ..11    .111    ..11    1.1.    1...
1..1    1.11    .11.    11.1    ..1.    1.11
1..1    111.    1.11    11..    ...1    11..
1.11    .111    1..1    1111    ...1    .1..
1111    ..1.    1.1.    1..1    1111    ..1.
1...    .111    111.    .1.1    111.    1.1
..1.    ...1    ..11    1.1.    1...    1...
.111    11..    11.1    ..1.    ....    .1.1
.111    11.1    ..1.    .1..    .111    1.11
1...    .1..    .11.    ....    1...    ..11
1...    11.1    .111    111.    1..1    ...1
1.11    ....    ..11    .1..    ..1.    ..11
....    ..11    ..11    1111    .1..    ..1.
.1.1    .1.1    ..1.    11..    1...    111.
1.11    .1.1    .1..    ..11    .11.    11.1
1...    ..11    ..11    1...    ....    1..1
         32      33      34      35      36
11..    ...1    1...    ....    ....    ....
..1.    .11.    .1..    ....    ....    ....
1111    1111    ..1.    ....    ....    ....
.111    .111    ...1    ....    ....    ....
1...    .1.1    ....    1...    ....    ....
.1.1    .11.    ....    .1..    ....    ....
.1..    .111    ....    ..1.    ....    ....
1...    11.1    ....    ...1    ....    ....
11.1    11..    ....    ....    1...    ....
1.11    1..    ....    ....    .1..    ....
.1..    1.1.    ....    ....    ..1.    ....
1..1    111.    ....    ....    ...1    ....
..11    .1..    ....    ....    ....    1...
11.1    1...    ....    ....    ....    .1..
.1..    1.1.    ....    ....    ....    ..1.
1..1    11.1    ....    ....    ....    ...1
``` syndrome generation means for generating syndrome S from a codewords read from said memory, decode means responsive to the output of said syndrome generation means for identifying all possible single bit error syndromes of said codeword and all possible double bit error syndromes of said codeword; and means to determine the location of any single or double bit errors once they are identified by said decode means.

2. The error correction system of claim 1 wherein decode means includes a table means being accessed by less than all the bits in syndrome S from said syndrome generation means to generate a first vector $E_1$ which identifies the location of a bit in error when said syndrome S has a non-zero value and $E_1 \neq 0$, exclusive-OR circuits means T responsive to the output of said syndrome generating means for generating a second vector $E_0 = T S^t$ from said syndrome S where $S^t$ is the transpose of the syndrome S, second exclusive-OR means for exclusive-ORing said first and second vectors $E_1$ and $E_0$ bit position by bit position to generate a third vector $E_2$ which will identify a second error if $E_2$ is a non-zero number and the weight of S is odd.

3. The error correction system of claim 2 wherein said decoder means includes uncorrectable error indication means which signals an uncorrectable error UE when $E_1=0$ or $E_2\neq 0$ when S is even.

4. The error correction system of claim 3 including table means responsive to said UE signal to indicate which of the N packages has failed.

5. The error correction system of claim 2 including Galois field number to binary sequence transformation means and a binary decoder means responsive to said vectors $E_1$ and $E_2$ to locate the bit position of errors identified by said vectors.

6. The error correction system of claim 2 includes table lookup means responsive to $E_2$ to locate said second error when $E_2\neq 0$ and the weight of S is odd and detection means responsive to the syndrome S and the second exclusive-OR means for providing the indication of an uncorrectable error if $E_2\neq 0$ and the weight of S is even to indicate a UE condition.

7. In an error correction system having a double bit error correction and a triple bit error detection code for a memory and having means for the generation of a syndrome S from a codeword generated in accordance with said code, decoder table lookup means comprising, a table means for being accessed by less than all the bits in the syndrome S generated by said error correction system to generate a first vector $E_1$ which identifies the location of a bit in error when said syndrome S has a non-zero value and $E \neq 0$, exclusive-OR circuit means T responsive to said syndrome S for generating a second vector $E_0 = TS^t$ from said syndrome S where $S^t$ is the transpose of the syndrome S, and second exclusive-OR circuit means for exclusive-ORing said first and second vectors $E_1$ and $E_0$ bit position by bit position to generate a third vector $E_2$ which will identify a second bit error if S is a non-zero number and the weight of S is odd.

8. The error correction system of claim 7 wherein said decoder means includes uncorrectable error indication means which signals an uncorrectable error UE when $E_1=0$ or $E_2\neq 0$ when S is even.

9. The error correction system of claim 8 including table means responsive to said UE signal to indicate which of the N packages has failed.

10. The error correction system of claim 7 including Galois field number to binary sequence transformation means and a binary decoder means responsive to said vectors $E_1$ and $E_2$ to locate the bit position of errors identified by said vectors.

11. The error correction system of claim 7 includes table lookup means responsive to $E_2$ to locate said second error when $E_2\neq 0$ and the weight of S is odd, and detection means responsive to the syndrome S and the second exclusive-OR means for determining if $E_2\neq 0$ and the weight of S is even to indicate an UE condition.

* * * * *